Feb. 7, 1956  J. A. ENGLISH  2,733,479
INJECTION MOLDING EQUIPMENT
Filed Nov. 1, 1952  2 Sheets-Sheet 1

INVENTOR.
JOHN A. ENGLISH
BY
Albert Sperry
ATTORNEY

Feb. 7, 1956  J. A. ENGLISH  2,733,479
INJECTION MOLDING EQUIPMENT
Filed Nov. 1, 1952  2 Sheets-Sheet 2

INVENTOR.
JOHN A. ENGLISH
BY Albert Sperry.
ATTORNEY

United States Patent Office 2,733,479
Patented Feb. 7, 1956

2,733,479

INJECTION MOLDING EQUIPMENT

John A. English, Yardley, Pa.

Application November 1, 1952, Serial No. 318,215

7 Claims. (Cl. 18—42)

This invention relates to injection molding apparatus and is directed particularly to equipment for simultaneously molding a plurality of different articles.

It is common practice to employ molds having a number of cavities for producing several articles simultaneously by injection molding processes. However, the cost of the molds or dies used in such operations is very high and therefore injection molding processes have, in general, been confined to operations in which many thousands or even millions of identical articles are to be produced. When a limited number of molded articles are required the expense in producing the die has made it necessary heretofore to use a single cavity mold and it is seldom feasible to employ injection molding operations.

In accordance with the present invention, a novel type of apparatus is provided wherein numerous mold cavities are provided and these cavities are individually variable so that a limited number of any particular piece may be produced and a great variety of mold cavities can be interchangeably incorporated in the molding apparatus. This result is preferably attained by providing the molding apparatus with a number of replace dies constructed and arranged for simultaneous use in injection molding equipment.

One of the objects of the present invention is to reduce the cost of molding a limited number of pieces and to increase the variety of pieces which can be produced by injection molding equipment.

Another object of the invention is to provide a novel type of injection molding equipment adapted to receive a plurality of replaceable dies.

A further object of the invention is to provide injection molding equipment with complementary members defining gates leading to each of a number of recesses in which dies may be replaceably secured.

Another object of the invention is to provide novel types of dies which may be changeably received by the members of the injection molding apparatus.

These and other objects and features of the present invention will appear from the following description thereof in which reference is made to the figures of the accompanying drawing.

Figure 2:
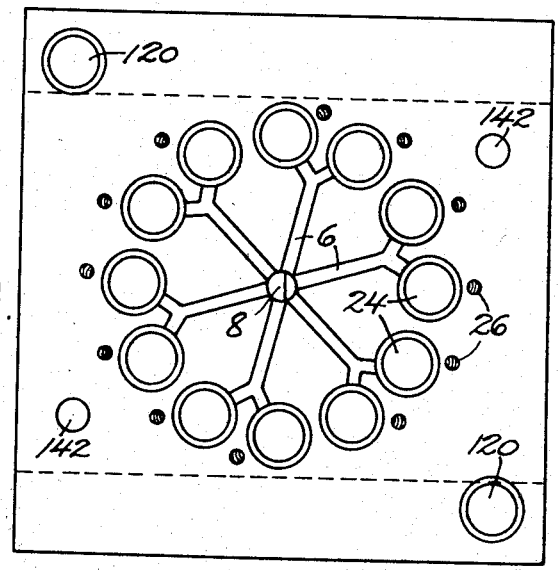
Fig. 2 is a plan view taken on the parting line 2—2 of Fig. 3 showing one molding member adapted for use in the present invention.
Figure 3:
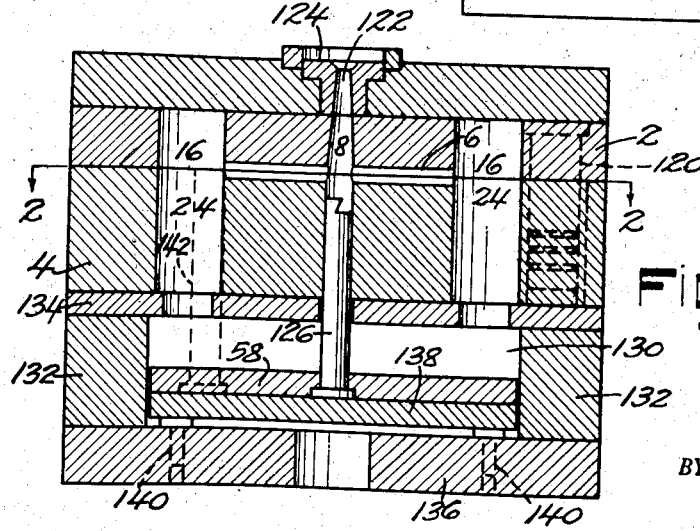
Fig. 3 is a vertical sectional view through a typical molding assembly embodying the present invention.
Figures 4, 5, 6:
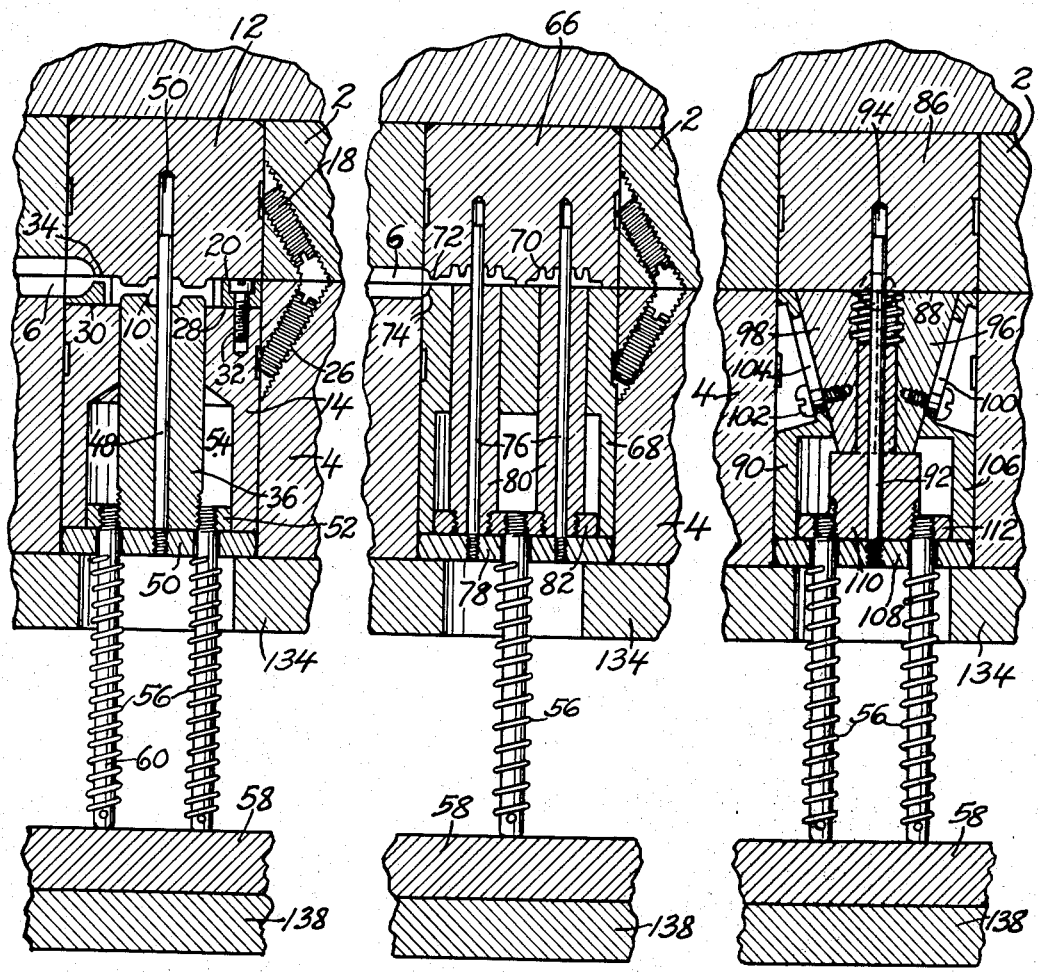
Fig. 4 is a longitudinal sectional view through one die assembly which may be used in the construction of Fig. 3.
Fig. 5 is a vertical sectional view through an alternative die assembly which may be used in the construction of Fig. 3.
Fig. 6 is a vertical sectional view through a further alternative die assembly which may be used in the construction of Fig. 3.

In that form of the invention chosen for purposes of illustration in Figs. 2, 3 and 4, the injection molding apparatus is provided with a stationary molding member 2 and a movable member 4 which are separable along a parting line passing through the gate channels 6 through which the molten plastic composition flows from the sprue passage 8 to the cavities 10 formed in die members 12 and 14.

As shown in Fig. 4 the die member 12 is designed to fit snugly within a recess 16 in the stationary molding member 2 and is held fixedly in position by a set screw or other retaining device 18. When properly positioned within the recess 16, the die member 12 presents an outer face 20 forming a portion of the mold cavity 10 and further provided with a channel 22 leading from the cavity to the side of the recess 16 for communication with a gate channel 6.

The die member 14 which is carried by the movable mold member 4 has a body 23 which is similarly adapted to be received within a recess 24 within the movable mold member and is fixedly held in place by a set screw or other retaining element 26. The portion of the cavity 10 in the die member 14 is complementary to the portion of the cavity in the face 20 of the die member 12. In molding pieces such as gears, bushings and the like which have opposed flat surfaces, the die members 12 and 14 may both have flat faces as indicated at 20 and 28 respectively and the toothed or peripheral portion of the mold cavity may be defined by a supplemental mold ring as shown at 30 in Fig. 4. This mold ring may be secured to the body 31 of die member 14 by means of a screw 32 or otherwise and is positioned to surround the central portion of the face 28. Ring 30 is provided with a passage 34 leading from cavity 10 to the edge of recess 24 for communication with one of the gate channels 6.

In the alternative the face 28 of the body of die member 14 may be formed with a suitable contour for defining a mold cavity of irregular form or as shown in Fig. 4 the mold cavity may be defined in part by a central sleeve 36 which is centrally located with respect to cavity 10 and slidably movable with respect to the die member 14. The sleeve 36 in the construction shown in Fig. 4 serves also as ejecting means for discharging a molding piece from the die cavity on separation of the molding members. In those instances wherein the piece being molded is provided with a central opening as represented by the gears and bushings 38, 40, 42, 44 and 46 of Fig. 1 a central pin 48 is provided which is slidably movable with respect to the sleeve 36 and received within a complementary recess 50 in die member 12 when the mold members and dies are moved to the closed positions shown in Figs. 3 and 4.

The pin 48 is secured at its inner end to a wafer 50 engageable by the inner end of the die member 14. The inner end of the sleeve 36 is secured to a ring 52 slidably movable within the chamber 54 in the die member 14. Pins 56 are carried by the ring 52 and project rearwardly through the wafer 50 for engagement with an ejector plate 58. Springs 60 surround the pins 56 and bear against the wafer 50 so as to urge the sleeve 36 inward to its retracted and normal molding position while permitting outward movement of the sleeve to eject the piece from the portion of mold cavity 10 and to strip the piece from the central pin 48 (when used) upon movement of the ejector plate 58 toward the die member 14.

The die member 12 and the assembly which make up the die member 14 and its sleeve 36, pins 56 and springs 60 form a unit which is removable from the mold members 2 and 4 so that another unit consisting of a different pair of die members having a different mold cavity can be substituted therefor. A large number of different units or die assemblies can therefore be interchangeably used to produce a great variety of pieces without change or replacement of any other molding members or dies used in the apparatus. Moreover, when successively molding pieces such as those illustrated at 38, 40 and 44 it is frequently found that the only element of the assembly which need be changed in producing a new piece is the periphery defining mold ring 30 of Fig. 4. In those cases wherein the cavity 10 is formed entirely within the die member 14, the die member 12 may present a flat face 20 for completing the cavity and only the die members 14 need be changed in order to produce a different piece.

Figure 1:
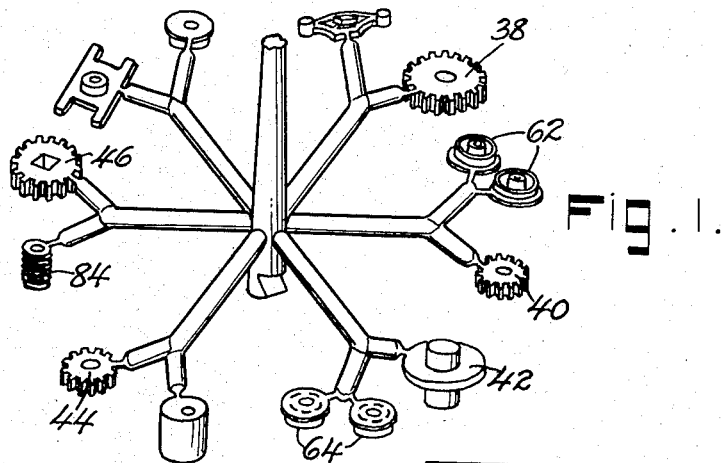
Fig. 1 is a perspective showing of a typical assembly of molded elements which may be produced in accordance with the present invention.

When producing small pieces such as those illustrated at 62 and 64 in Fig. 1, the die members may be provided with two or more cavities as illustrated by the construction of Fig. 5. In the latter die assembly the die member 66 is carried by the molding member 2 and the die member 68 is carried by the movable molding member 4. The die member 66 is formed with two cavity portions 70 connected by suitable passages 72 to the common passage 74 leading to one of the gate channels 6. The die member 68 in this case is provided with two pins 76 carried by the wafer 78 and positioned centrally with respect to the die cavities 70. Ejecting sleeves 80 surround the pins 76 and are carried by the ring 82 for actuating the ejecting sleeves in removing the molded pieces from the die cavities.

The further alternative construction shown in Fig. 6 is adapted for use in molding pieces having lateral projections as represented by the worm 84 in Fig. 1. In the mold assembly of Fig. 6 the die member 86 presents a flat face 88 and is carried by the stationary molding member 2 while the die member 90 is carried by the movable molding member 4. The central pin 92 of the die member 90 projects into the recess 94 in the die member 86. The mold cavity is defined primarily by the complementary members 96 and 98 which are split longitudinally of the assembly for lateral movement so as to disengage the threads on the sides of the molded piece on completion of a molding operation and permit axial ejection of the piece from the die member 90. In order to effect such separation of the members 96 and 98 the outer faces 100 of the members are inclined and are provided with guide pins or screws 102 received within the slots 104 in the body 106 of the die member. The central pin 92 is carried by the wafer 108 of the assembly and surrounded by the ejector sleeve 110 which in turn is mounted on the ring 112. With this assembly the members 96 and 98 when retracted and in mating engagement define a threaded cavity communicating with one of the gate channels 6 for receiving the molding composition in forming a piece. After the cavity in the die members 96 and 98 has been charged with the molding composition and the piece is ready for discharge, the longitudinal movement of the ejector sleeve 110 serves to cause the members 96 and 98 to slide upward and outward over the inclined faces 100 of the body 106 whereby the members are separated to disengage the threads on the molding piece 84.

The means provided for actuating the mold members 2 and 4 may be of any conventional type. However, as shown in Fig. 3 the stationary mold member 2 is provided with guide pins 120 along which the movable mold member 4 is slidable to open and close the mold cavities. The sprue passage 8 in the stationary mold member 2 communicates with a sprue nozzle 122 in the sprue fitting 124 through which the molten plastic composition is supplied and the gate channels 6 are arranged to communicate with the sprue nozzle.

The movable mold member 4 is provided with a central opening through which a sprue puller pin 126 extends and the latter pin is carried by the ejector plate 58 which is also engaged by the pins 60 of the various die assemblies. The ejector plate is movable within the space 130 formed by the spacer blocks 132 and between the die supporting web 134 and the movable mold head 136. The movements of the mold head 136, movable mold member 4 and ejector plate 58 are controlled by suitable means (not shown) so that after the pieces have been molded the movable mold member is retracted and carries the sprue puller pin 126 therewith so that the sprue, gates, and molded pieces are withdrawn from the stationary mold 2. The ejector plate then moves toward the die supporting web 134 of the movable mold member and in so doing moves the sprue puller pin and the various ejecting sleeves of the die assemblies forward against the action of the springs 60 to eject the molded assembly including the sprue, gates and pieces shown in Fig. 1 from the movable mold member and its dies and any pins such as the central pin 48 which may be carried by the dies.

An ejector retaining plate 138 is positioned between the ejector plate 60 and the head 136 and when in retracted position is accurately located by spacer pins 140 for limiting the inward movement of the ejector plate when the mold is closed. Return pins 142 extend from the ejector retaining plate through openings in the movable mold member 4 whereby the ejector plate may be guided in its movements relative to the movable mold member.

In using the construction described the mold members 2 and 4 are separated and the die members 12 required for producing the desired pieces are slipped into the recesses 16 in the stationary mold member 2, after which they are secured in place by the set screws 18. In a similar way the complementary die members 14 are slipped into the recesses 24 in the movable mold member 4 and when properly oriented to bring the passages 34 into communication with the gate channels 6 the die members are secured fixedly in place by the set screws 26.

When all of the various die members for forming whatever pieces are required have been secured to the stationary movable mold members the members are moved into closed position. Thereafter the molten plastic composition is injected through the sprue passage 8 in the sprue fitting 124 to the gate channels 6 from which it flows to the mold cavities 10 in each of the various die members 12 and 14. At the same time the molten composition flows into engagement with the exposed end of the sprue puller pin. When the material has been properly molded the mold members 2 and 4 are separated and the assembly and gates of molded articles are ejected from the mold cavities to produce the article shown in Fig. 1 from which the molded pieces may be separated. The operation is then repeated as often as required to produce additional sets of molded pieces.

When a sufficient number of a particular type of pieces has been produced the die members 12 and 14 used in producing that particular piece are readily removed from the mold members 2 and 4 by withdrawing the set screws 18 and 26 respectively. The die members 12 and 14 for that piece can then be removed without disturbing any of the remaining elements of the assembly. An alternative set of die members can then be inserted for producing a different piece or if no additional pieces are required a die block may be inserted into the recesses in the mold members to render that portion of the molding equipment inactive.

When the change in the pieces to be produced involves only the outer contour or periphery of the pieces, the only element of the assembly which need be changed is the mold ring 30 of the construction shown in Fig. 4. When the new die assembly has been inserted or that portion of the die has been blocked off the molding operation may be renewed and continued until other die assemblies require replacement.

It is thus apparent that the construction of the present invention renders it possible to produce an infinite variety of pieces with a minimum of variation and expense in the molding equipment. The cost of the individual dies employed in the apparatus is reduced greatly and the equipment is made so versatile that a limited number of pieces of any particular type can be produced economically and without serious interruption in the production of those pieces required in quantity.

In producing small items such as plastic gears, worms and the like, the variation in the number and size of the teeth or threads on the gears has heretofore made the use of the ejection molding equipment prohibitive since the number of large and expensive molding members and dies required have been so numerous. The means of the present invention, the production of such small and inexpensive gears and the production of other pieces such as positions, fittings and the like is made possible with a minimum of expense by reason of the limited change required and the reduced cost of the dies employed.

While several different types of die assemblies have been illustrated in the figures of the drawings, it will be apparent that other and alternative forms of die assemblies may be used. Furthermore, no structural change is required in the molding equipment in order to accommodate the construction of the present invention.

It will thus be apparent that the construction of the present invention is capable of many modifications and changes and accordingly it should be understood that the particular embodiments of the invention shown in the drawings and described above are intended to be illustrative only and are not intended to limit the scope of the invention.

I claim:

1. Injection molding equipment comprising relatively movable mold members defining gate channels, at least one of said members having a plurality of similar recesses therein communicating with said channels, and a plurality of die members of similar cross section interchangeably secured in said recesses and formed with mold cavities communicating with said channels, each of said die members having a body formed with a bore extending therethrough, a sleeve slidably mounted within said bore, the inner ends of said body and said sleeve cooperating to form a portion of a mold cavity, ejection means carried by said sleeve and projecting beyond the rear end of said body, means urging said sleeve and said ejection means rearwardly, stop means carried by said body for limiting rearward movement of said sleeve, and means movable with respect to said molding members for actuating said ejection means.

2. Injection molding equipment comprising relatively movable mold members defining a gate channel, at least one of said members having a recess therein communicating with said channel, a die member removably fitting said recess and having a mold cavity therein communicating with said channel, said die member being formed with a bore extending therethrough, means securing said die member in said recess, a forming pin carried by said die member and projecting into said mold cavity, an ejection sleeve slidably mounted in said bore and surrounding said forming pin, the inner ends of said body and said sleeve cooperating to form a portion of said mold cavity, an ejection pin carried by said sleeve and projecting beyond the rear end of said body, said sleeve being movable lengthwise of said body to remove a molded piece from said cavity and forming pin, spring means urging said sleeve to a retracted molding position, and means on said molding equipment engageable with said ejection pin for moving said ejection sleeve lengthwise of said forming pin against the action of said spring means to eject a molded piece from said mold cavity and to strip the piece from said forming pin.

3. Injection molding equipment comprising a mold member having a plurality of gate channels therein, said mold member having a plurality of identical die receiving recesses therein each of which recesses communicates with one of said gate channels, a plurality of die members of identical external cross section interchangeably fitting said recesses and each having a mold cavity therein formed to communicate with one of said channels, one of said die members having a body with laterally separable elements movably mounted thereon and defining at least a portion of said mold cavity, means for moving said elements laterally with respect to each other into and out of molding position, means carried by said body for moving a molded piece axially of the die member to eject said piece from said mold cavity, and means releasably securing said die members in said recesses.

4. A die member adapted to be removably secured in a recess in a mold member of injection molding equipment, said die member comprising a body formed with a bore extending therethrough, a sleeve slidably mounted in said bore, with means adjacent one end of said body and said sleeve cooperative to at least partially define a mold cavity, ejection means carried by said sleeve, said sleeve and ejection means being movable axially of said body to eject a molded piece from said mold cavity, said ejection means having a part projecting from the opposite end of said body for actuating the ejection means.

5. A die member adapted to be removably secured in a recess in a mold member of injection molding equipment, said die member comprising a body presenting surfaces inclined with respect to the axis of the body, laterally separable elements defining at least a portion of a mold cavity, said elements being movable along said inclined surfaces into and out of molding position, ejection means carried by said body and movable axially thereof to eject a molded piece from said mold cavity, said ejection means having a part projecting from the opposite end of said body for actuating the ejection means.

6. Injection molding equipment for simultaneously forming a plurality of differently shaped articles, said equipment comprising a die carrier having a sprue passage, a plurality of gate channels radiating from said sprue passage and communicating therewith, a plurality of identical die receiving recesses located adjacent each of said gate channels and communicating therewith, said recesses extending completely through said die carrier, and die inserts removably secured within said recesses, said die inserts being interchangeable and each having a portion defining a portion of a mold cavity for forming an article, ejection means carried by said die inserts and projecting beyond the rear of said die carrier.

7. Injection molding equipment for simultaneously forming a plurality of differently shaped articles, said equipment comprising a die carrier having a sprue passage, a plurality of gate channels radiating from said sprue passage and communicating therewith, a plurality of identical die receiving recesses located adjacent each of said gate channels and communicating therewith, said recesses extending completely through said die carrier, and die inserts removably secured within said recesses, said die inserts being interchangeable and each comprising a body having a bore extending therethrough, a sleeve slidably mounted in said bore, the inner ends of said body and said sleeve cooperating to define a mold cavity, an ejection pin carried by said sleeve and projecting beyond the rear end of said die carrier, means urging said sleeve and said ejection pin rearwardly, and stop means carried by said body for limiting rearward movement of said sleeve.

References Cited in the file of this patent

UNITED STATES PATENTS

| Number | Name | Date |
|---|---|---|
| 2,327,665 | Peat | Aug. 24, 1943 |
| 2,330,369 | Marsh | Sept. 28, 1943 |
| 2,366,475 | Bartholomew | Jan. 2, 1945 |
| 2,443,826 | Johnson | June 22, 1948 |
| 2,446,872 | Ehlers | Aug. 10, 1948 |
| 2,571,766 | Saulino | Oct. 16, 1951 |
| 2,574,223 | Nichols | Nov. 6, 1951 |